United States Patent [19]

Sakano et al.

[11] 4,299,929
[45] Nov. 10, 1981

[54] THERMOPLASTIC RESIN COMPOSITION EXCELLENT IN DWELLING THERMAL STABILITY

[75] Inventors: Hajime Sakano, Osaka; Mikio Kodama, Nagisasakae; Akitoshi Ito, Osaka; Miyuki Terada, Amagasaki, all of Japan

[73] Assignee: Sumitomo Naugatuck Co., Ltd., Osaka, Japan

[21] Appl. No.: 169,090

[22] Filed: Jul. 15, 1980

[30] Foreign Application Priority Data

Mar. 19, 1980 [JP] Japan ................................ 55-35668

[51] Int. Cl.$^3$ ..................... C08L 55/02; C08L 51/04
[52] U.S. Cl. ............................. 525/67; 260/45.85 R; 525/329; 525/336; 525/386; 525/194
[58] Field of Search ..................... 525/67, 194, 386

[56] References Cited

U.S. PATENT DOCUMENTS

| | | | |
|---|---|---|---|
| 3,130,177 | 4/1964 | Grabowski | 525/67 |
| 3,162,695 | 12/1964 | Grabowski | 525/67 |
| 3,852,394 | 12/1974 | Kubota et al. | 525/67 |
| 3,981,843 | 9/1976 | Yoshizaki et al. | 525/67 |

*Primary Examiner*—Carman J. Seccuro
*Attorney, Agent, or Firm*—Birch, Stewart, Kolasch and Birch

[57] ABSTRACT

A thermoplastic resin composition with excellent dwelling thermal stability which comprises 100 parts by weight of a resin composition comprising a polymer (A) obtained by polymerization of at least two kinds of monomers selected from the group consisting of aromatic vinyl compounds, vinyl cyanide compounds and carboxylic acid alkyl esters in the presence of a conjugated diene rubber and a polycarbonate resin (B) in a weight proportion of from 10:90 to 90:10 and 0.05 to 5.0 parts by weight of at least one acid compound (C) chosen from inorganic acids, organic acids and organic acid anhydrides.

4 Claims, No Drawings

THERMOPLASTIC RESIN COMPOSITION EXCELLENT IN DWELLING THERMAL STABILITY

The present invention relates to a thermoplastic resin composition excellent in dwelling thermal stability at molding temperature.

Blend mixtures of ABS type resins and polycarbonate resins such as a mixture of an ABS resin and a polycarbonate resin (U.S. Pat. Nos. 3,130,177, 3,954,905 and 3,988,389), a mixture of an MBS resin and a polycarbonate resin (U.S. Pat. No. 3,162,695), or a mixture of an ABSM resin and a polycarbonate resin (Japanese Patent Publication No. 11496/1967) and a mixture of an ABS resin and a halogenated polycarbonate resin (U.S. Pat. No. 3,947,524) have been widely utilized due to their excellent mechanical properties and molding-processability. However, they are insufficient in dwelling thermal stability, and their dwelling thermal stability at usual molding temperature is substantially inferior to that of an ABS type resin alone or of a polycarbonate resin alone. When they remain in a cylinder during molding, their decomposition starts in an extremely short time, and the resultant molded products do not possess a satisfying quality. Further, the impact strength is greatly reduced in dwelling in a short time.

As the result of an extensive study, it has now been found that the incorporation of an acid or its anhydride into a mixture of an ABS type resin and a polycarbonate resin is quite effective in improvement of the dwelling thermal stability of such a mixture.

According to the present invention, there is provided a thermoplastic resin composition with excellent dwelling thermal stability which comprises 100 parts by weight of a blend mixture comprising a polymer obtained by the polymerization of at least two kinds of monomers selected from the group consisting of aromatic vinyl compounds, vinyl cyanide compounds and carboxylic acid alkyl esters in the presence of a conjugated diene rubber (hereinafter referred to as "ABS type resin") and a polycarbonate resin in a weight proportion of from 10:90 to 90:10 and 0.05 to 5.0 parts by weight of at least one acid compound selected from the group consisting of inorganic acids, organic acids and organic acids anhydrides.

The ABS type resin may be chosen from graft copolymers obtained by graft polymerization of at least two kinds of monomers selected from the group consisting of aromatic vinyl compounds, vinyl cyanide compounds and methacrylic esters onto diene rubbers, mixtures of said graft copolymers with copolymers obtained by polymerization of at least two kinds of monomers selected from the group consisting of aromatic vinyl compounds, vinyl cyanide compounds and methacrylic esters, mixtures of copolymers obtained by diene monomers with vinyl cyanide compounds with copolymers obtained by polymerization of at least two kinds of monomers selected from the group consisting of aromatic vinyl compounds, vinyl cyanide compounds, methacrylic esters, and the like. Typical examples of the ABS resin and their production are described in Encyclopedia of Polymer Science and Technology, Vol. 1, pages 436 to 444 (1964) and Kirk-Othmer's Encyclopedia of Chemical Technology, 3rd Ed., Vol. 1, pages 442 to 456 (1978).

As the conjugated diene rubber constituting a part of the ABS type resin, here may be exemplified polybutadiene, butadiene-styrene copolymer, butadiene-acrylonitrile copolymer, and the like. Examples of the aromatic vinyl compounds are styrene, $\alpha$-methylstyrene, dimethylstyrene, vinyltoluene, and the like. Examples of the vinyl cyanide compounds are acrylonitrile, methacrylonitrile, and the like. Examples of the carboxylic acid alkyl esters are methyl acrylate, ethyl acrylate, butyl acrylate, methyl methacrylate, ethyl methacrylate, butyl methacrylate, hydroxyethyl acrylate, hydroxyethyl methacrylate, hydroxypropyl methacrylate, and the like.

The preparation of the ABS type resin by the use of the above mentioned compounds may be effected by a conventional polymerization procedure such as emulsion polymerization, suspension polymerization, solution polymerization or bulk polymerization. The kinds and the amounts of the monomers may be conventional and are chosen appropriately. Some typical examples are shown in the Examples as hereinafter presented.

As the polycarbonate resin, there may be exemplified aromatic polycarbonates, aliphatic polycarbonates, aliphatic-aromatic polycarbonates, and the like. In usual, polymers and copolymers of bisphenols such as 2,2-bis(4-hydroxyphenyl)alkanes, bis(4-hydroxyphenyl)ethers, bis(4-hydroxyphenyl)sulfones, bis(4-hydroxyphenyl)sulfides and bis(4-hydroxyphenyl)sulfoxides and/or halogenated bisphenols are employed. Typical examples of the polycarbonate resin and their production are described in Encyclopedia of Polymer Science and Technology, Vol. 10, pages 710 to 764 (1969).

The weight proportion of the ABS type resin and the polycarbonate resin in the blend mixture is from 10:90 to 90:10. When the amount of the ABS type resin is smaller than the said lower limit or the amount of the polycarbonate resin is larger than the said higher limit, mechanical properties are deteriorated, and particularly the improvement of the impact strength which is the most notable characteristic of the blend mixture comprising the ABS type resin and the polycarbonate resin, can not be expected. When the amount of the ABS type resin is larger than the said higher limit or the amount of the polycarbonate resin is smaller than the said lower limit, the thermal properties, particularly the heat resistance, are greatly reduced.

As the inorganic acid, there may be exemplified hydrochloric acid, sulfuric acid, nitric acid, phosphorous acid, phosphoric acid, carbonic acid, and the like. The use of sulfuric acid, phosphorous acid or phosphoric acid is particularly favored in practice. As the organic acid, there may be exemplified carboxylic acids represented by the formula: R—COOH (wherein R is a monovalent organic group having not more than 21 carbon atoms such as alkyl), HOOC—R'—COOH (wherein R' is a divalent organic group having not more than 21 carbon atoms such as alkylene), sulfonic acids of the formula: R—SO$_3$H (wherein R is as defined above), sulfinic acids, phenols, and the like. Practically, the use of a monocarboxylic acid such as acetic acid or a higher fatty acid, an aliphatic dicarboxylic acid such as maleic acid or fumaric acid or an aromatic dicarboxylic acid such as phthalic acid is preferred. Examples of the organic acid anhydride are dicarboxylic acid anhydrides such as maleic anhydride and phthalic anhydride.

In the composition of the invention, at least one acid compound chosen from the above mentioned inorganic acids, organic acids and organic acid anhydrides is employed. The amount of the acid compound should be in a range of 0.05 to 5.0 parts by weight to 100 parts of the combined amount of the ABS type resin (A) and the polycarbonate resin (B). When the amount of the acid compound is smaller than 0.05 part by weight, its dispersion into the resin is insufficient, and the effect of improving the dwelling thermal stability is hardly realized. When the amount is larger than 5.0 parts by weight, the heat resistance of the composition is lowered.

Illustrating the action of the acid compound on the resin composition comprising the ABS resin and the polycarbonate resin, the polycarbonate resin in such composition is depolymerized on dwelling so that the molecular weight is lowered. Because of this reason, the impact strength and thermal stability of the resin composition markedly deteriorates. The acid compound may react with the decomposition substances produced on dwelling to prevent the further decomposition and depolymerization of the polycarbonate resin.

Mixing of the ABS type resin, the polycarbonate resin and the acid compound may be effected by the aid of a conventional mixing machine. Concrete examples of mixing procedures are as follows: mixing the ABS type resin with the polycarbonate resin and adding thereto the acid compound; mixing the ABS type resin (or the polycarbonate resin) with the acid compound and adding thereto the polycarbonate resin (or the ABS type resin); mixing the ABS type resin, the polycarbonate resin and the acid compound all at once; and so forth.

The present invention will be hereinafter explained further in detail by the following Examples wherein part(s) and % are by weight.

EXAMPLES 1 to 8 and COMPARATIVE EXAMPLES 1 to 3

[ABS type polymer]

According to the following prescription, acrylonitrile-butadiene-styrene resin (ABS-1), methyl methacrylate-butadiene-styrene resin (MBS) and acrylonitrile-butadiene-styrene-methyl methacrylate resin (ABSM) were prepared by polymerization:

| Prescription | (Parts (s)) | | |
|---|---|---|---|
| | ABS-1 | MBS | ABSM |
| Polybutadiene (solid content) | 30 | 30 | 30 |
| Styrene | 45 | 45 | 40 |
| Acrylonitrile | 25 | — | 15 |
| Methyl methacrylate | — | 25 | 15 |
| Potassium peroxide | 0.5 | 0.5 | 0.5 |
| Potassium oleate | 0.5 | 0.5 | 0.5 |
| Water | 160 | 160 | 160 |

The polymerization was carried out at 65° C. for 6 hours (polymerization degree, 95% or more). After addition of trisnonylphenyl phosphite (1 part) as the antioxidant, an aqueous solution containing sulfuric acid (3 parts) and sodium chloride (3 parts) as the agent for salting-out was further added, and the temperature was elevated up to 80° C. The precipitated product was collected and dried to obtain the polymer in powder form.

Commercially available heat-resistant ABS resin (ABS-2): "Kralastic K-2938" (manufactured by Sumitomo Naugatuck Co., Ltd.).

[Polycarbonate resin]

Commercially available polycarbonate resin: "Panlite L-1250W" (manufactured by Teijin Kasei K.K.).

[Inorganic acid, organic acid and organic acid anhydride]

Sulfuric acid, phosphoric acid, phosphorous acid, acetic acid, maleic acid, phthalic acid, maleic anhydride, phthalic anhydride.

The components were mixed together in a proportion shown in Table 1 by the aid of a conventional mixer. The obtained mixture was pelletized by the aid of an extruder (40 mm diameter; manufactured by Thermoplastic Co., Ltd.).

The dwelling thermal stability (foaming and decomposition) of the resultant composition was examined by the aid of a flow tester (Koka type). Then, the composition was charged into a cylinder and made to remain therein at 260° C. for 5 minutes. From the thus treated composition, a sample piece was prepared by molding, and its dwelling thermal stability (impact strength) was examined.

From the above obtained composition (pellet), another sample piece was prepared by molding at 260° C. by the aid of an injection molding machine (TS-150; manufactured by Nissei Jushi K.K.), and its impact strength and heat resistance as well as silver streak were examined.

The results are shown in Table 1.

TABLE 1

| Thermoplastic resin composition | Example | | | | | | | | Comparative Example | | |
|---|---|---|---|---|---|---|---|---|---|---|---|
| | 1 | 2 | 3 | 4 | 5 | 6 | 7 | 8 | 1 | 2 | 3 |
| (A) ABS type resin (parts(s)) | | | | | | | | | | | |
| ABS-1 | 50 | — | — | — | — | — | — | — | — | — | — |
| ABS-2 | — | 60 | — | — | 50 | 50 | 50 | 50 | 50 | 5 | 95 |
| MBS | — | — | 50 | — | — | — | — | — | — | — | — |
| ABSM | — | — | — | 60 | — | — | — | — | — | — | — |
| (B) Polycarbonate resin (parts(s)) | | | | | | | | | | | |
| Panalite L-1250W | 50 | 40 | 50 | 40 | 50 | 50 | 50 | 50 | 50 | 95 | 5 |
| (C) inorganic acid, organic acid or organic acid anhydride (part (s)) | | | | | | | | | | | |
| Sulfuric acid | 0.1 | — | — | — | — | — | — | — | — | — | — |
| Phosphoric acid | — | 0.2 | — | — | — | — | — | — | — | 0.2 | — |
| Phosphorous acid | — | — | 0.3 | — | — | — | — | — | — | — | — |
| Acetic acid | — | — | — | 0.5 | — | — | — | — | — | — | — |
| Maleic acid | — | — | — | — | 1.0 | — | — | — | — | — | 1.0 |
| Phthalic acid | — | — | — | — | — | 1.0 | — | — | — | — | — |
| Maleic anhydride | — | — | — | — | — | — | 0.2 | — | — | — | — |
| Phthalic anhydride | — | — | — | — | — | — | — | 0.3 | — | — | — |
| Dwelling thermal stability | | | | | | | | | | | |

TABLE 1-continued

| Thermoplastic resin composition | Example | | | | | | | | Comparative Example | | |
| --- | --- | --- | --- | --- | --- | --- | --- | --- | --- | --- | --- |
| | 1 | 2 | 3 | 4 | 5 | 6 | 7 | 8 | 1 | 2 | 3 |
| Foaming and decomposition at 270° C. (min) | 60 | 60 | 60 | 60 | 60 | 60 | 60 | 60 | 15 | 60 | 60 |
| Notched izod impact strength with 5 minutes'stay ¼" (g . cm/cm$^2$) | 48 | 44 | 48 | 46 | 48 | 47 | 48 | 46 | 4 | 10 | 12 |
| Silver streak | None | None | None | None | None | None | None | None | Observed | None | None |
| Impact resistance | | | | | | | | | | | |
| Notched izod impact strength ¼" (kg . cm/cm$^2$) | 65 | 53 | 68 | 64 | 55 | 54 | 68 | 53 | 35 | 12 | 14 |
| Heat resistance | | | | | | | | | | | |
| Deformation temperature (°C.) 264 psi, no annealing | 118 | 121 | 119 | 118 | 119 | 120 | 118 | 122 | 118 | 128 | 97 |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A thermoplastic resin composition with excellent dwelling thermal stability which comprises 100 parts by weight of a resin composition comprising a polymer (A) obtained by polymerization of at least two kinds of monomers selected from the group consisting of aromatic vinyl compounds, vinyl cyanide compounds and carboxylic acid alkyl esters in the presence of a conjugated diene rubber and a polycarbonate resin (B) in a weight proportion of from 10:90 to 90:10 and 0.05 to 5.0 parts by weight of at least one acid compound (C) chosen from inorganic acids, organic acids, maleic anhydride and phthalic anhydride.

2. The thermoplastic resin composition according to claim 1 wherein the acid compound (C) is an inorganic acid selected from the group consisting of hydrochloric acid, sulfuric acid, nitric acid, phosphorous acid, phosphoric acid, carbonic acid or mixture thereof.

3. The thermoplastic resin composition according to claim 1, wherein the acid compound (C) is a organic acid selected from the group consisting of mono or dicarboxylic acids having not more than 21 carbon atoms, a sulfonic acid, a sulfinic acid, a phenol or mixture thereof.

4. The thermoplastic resin composition according to claim 1, wherein the acid compound (C) is maleic anhydride, phthalic anhydride or mixtures thereof.

* * * * *

UNITED STATES PATENT AND TRADEMARK OFFICE
CERTIFICATE OF CORRECTION

PATENT NO. : 4,299,929
DATED : November 10, 1981
INVENTOR(S) : Sakano et al

It is certified that error appears in the above—identified patent and that said Letters Patent is hereby corrected as shown below:

In the category "[30] Foreign Application Priority Data" change "55-35668" to --55-35658--.

Signed and Sealed this

Ninth Day of February 1982

[SEAL]

Attest:

GERALD J. MOSSINGHOFF

Attesting Officer

Commissioner of Patents and Trademarks